US008903636B1

(12) United States Patent
Al Kandari et al.

(10) Patent No.: US 8,903,636 B1
(45) Date of Patent: Dec. 2, 2014

(54) ACCIDENT DETECTION SYSTEM AND METHOD FOR ACCIDENT DETECTION

(71) Applicants: Abdualrahman Abdullah Mohammad Al Kandari, Rumaithiya (KW); Imad Fakhri Alshaikhli, Kuala Lampur (MY)

(72) Inventors: Abdualrahman Abdullah Mohammad Al Kandari, Rumaithiya (KW); Imad Fakhri Alshaikhli, Kuala Lampur (MY)

( * ) Notice: Subject to any disclaimer, the term of this patent is extended or adjusted under 35 U.S.C. 154(b) by 0 days.

(21) Appl. No.: 14/094,524

(22) Filed: Dec. 2, 2013

(51) Int. Cl.
*G06F 19/00* (2011.01)
*G08G 1/01* (2006.01)

(52) U.S. Cl.
CPC .................................... *G08G 1/0145* (2013.01)
USPC .......................................................... 701/118

(58) Field of Classification Search
CPC .......... G08G 1/0104; G08G 1/096716; G08G 1/096775; G08G 1/01; G08G 1/065; G08G 1/07; G01C 21/3492; G06G 7/76
USPC .......................................................... 701/118
See application file for complete search history.

(56) References Cited

U.S. PATENT DOCUMENTS 5,357,436 A 10/1994 Chiu
5,646,853 A * 7/1997 Takahashi et al. ......... 455/456.5
5,668,717 A 9/1997 Spall
5,696,502 A 12/1997 Busch et al.
6,177,885 B1 1/2001 Weil et al.
7,983,839 B2 7/2011 Sutardja
2002/0008637 A1 1/2002 Lemelson et al.
2003/0014180 A1 1/2003 Myr
2006/0167617 A1 7/2006 Krikelis
2007/0222639 A1* 9/2007 Giles et al. .................... 340/907
2008/0094250 A1 4/2008 Myr
2010/0250107 A1* 9/2010 Desai et al. ................... 701/118
2013/0063282 A1* 3/2013 Baldwin et al. ............... 340/941
2013/0197790 A1* 8/2013 Ouali et al. ................... 701/118

FOREIGN PATENT DOCUMENTS

CN 102034360 A 4/2011
CN 201876992 U 6/2011
CN 102254441 A 11/2011
DE 199 44 077 A1 3/2001
WO WO 97/34274 A1 9/1997

OTHER PUBLICATIONS

Qinghui Lin, B.W. Kwan, and L.J. Tung, "Traffic Signal Control Using Fuzzy Logic", *Systems, Man, and Cybernetics, 1997. Computational Cybernetics and Simulation*, vol. 2, pp. 1644-1649 (Abstract only).

(Continued)

*Primary Examiner* — James Trammell
*Assistant Examiner* — Michael D Lang
(74) *Attorney, Agent, or Firm* — Richard C Litman

(57) ABSTRACT

The accident detection system is a smart system which uses fuzzy (probabilistic) logic to determine an approximate location of an accident or other traffic impediment based on sensors, such as wired or wireless sensors, scanning, detecting, and reporting the traffic flow across a number of traffic lanes and a cross-section of a roadway. The sensors in the accident detection system detect an area where traffic appears impeded based on the calculation of moving vehicles in nearby lanes or areas in a proximate location to the area where traffic appears impeded. The accident detection system utilizes a series of strategically placed sensors connected through the wireless or wired sensor network, which detects vehicles in real time to acquire data such as an impediment in traffic flow, such as an accident, an inoperative vehicle, and similar traffic disturbances.

12 Claims, 7 Drawing Sheets

(56) References Cited

OTHER PUBLICATIONS

Madhavi Arora and V. K., Banga, "Real Time Traffic Light Control System Using Morphological Edge Detection and Fuzzy Logic", 2nd International Conference on Electrical, Electronics and Civil Engineering (ICEECE'2012) Singapore Apr. 28-29, 2012, pp. 172-176.
Bilal Ahmed Khan and Nai Shyan Lai, "An Intelligent Traffic Controller Based on Fuzzy Logic", The First International Conference on Green Computing, Technology and Innovation (ICGCTI2013) Malaysia Mar. 4-6, 2013, pp. 89-93.

* cited by examiner

ACCIDENT DETECTION SYSTEM AND METHOD FOR ACCIDENT DETECTION

BACKGROUND OF THE INVENTION

1. Field of the Invention

The invention idea gets from PhD Thesis for first inventor (Alkandari) and supervised by second inventor (Al-Shaikhli) in International Islamic University Malaysia (IIUM). The present invention relates to an accident detection system. More specifically, the invention is a smart system for detecting accidents in a traffic management system for use in a roadway utilizing a two-layer framework and architecture that includes a physical layer and an application layer. The system is connected to and based on a wireless sensor network (WSN). The system utilizes a series of strategically placed sensors connected through the WSN, which senses vehicles in real time to acquire traffic data such as an impediment in traffic flow. The smart accident detection system incorporates fuzzy (probabilistic) logic via the sensors to detect accidents, inoperative vehicles, and similar traffic disturbances.

2. Description of the Related Art

In recent times, it has become difficult to know whether an accident has occurred and to determine the location where the traffic impediment has happened. It is difficult for traffic management systems to be informed of traffic accidents or traffic impediments and the local police or local traffic office are usually not informed until someone reports the traffic impediment. These traffic impediments add to an already congested roadway, increases commuter traffic time, and amplifies the probability of chance accidents resulting from further road congestion. Not to mention heavy traffic congestion means additional vehicle breaking and stopping which means more wear on vehicles, more money spent maintaining vehicles, and higher gas costs for automobile owners.

Advancements in technology have allowed for various forms of wireless communication technologies to be used in intelligent traffic management systems. These intelligent traffic management systems relate to different modes of transport and traffic flow. Traffic management systems enable various users to be better informed and make safer, more coordinated, and smarter use of transport roadways. The current forms of wireless technologies used in detecting traffic accidents can use a Global Positioning System (GPS) which is attached to a vehicle or a Global System for Mobile Communications (GSM) which is attached to a mobile device, for example.

Some traffic management systems use the GPS technology to monitor a GPS based vehicle in detecting traffic accidents. The GPS based vehicle commonly includes an accident identification module containing a vibrating sensor and a GPS modem connected to a microcontroller. The GPS monitors the speed of a vehicle and detects a vehicle's accident based on the monitoring of the vehicle's speed, the vibrating sensor, and sends the location and time of the accident from the GPS data processed by the microcontroller in a vehicle to alert a service center. Traffic accidents so determined are generally recorded and analyzed in guiding traffic on the roadway by a traffic management system.

Traffic management systems have also employed the use of Wireless Sensor-Actor Networks (WSANs) in traffic control. A typical WSAN consists of a larger set of miniaturized sensor nodes reporting their data to significantly fewer actor (actuator) nodes. Sensors probe their surroundings and report their findings to one or multiple actors, which process the collected sensor reports and respond to emerging events of interest.

The use of WSANs in assisting in the management of traffic systems is expected to decrease motor traffic delay, decrease commuter time, and increase work productivity. Moreover, earlier notification of traffic accidents can decrease accident fatalities and save precious human life. There appears to be a need for an accident detection system incorporating the use of sensor networks, such as wireless sensor networks, in detecting traffic accident and road impediments by allowing the sensor nodes to receive the approximate location of a traffic accident or impediment on the roadway and to provide a method of using that information to assist in the traffic management. Thus, an accident detection system infrastructure using a wireless sensor network addressing the aforementioned problems is desired.

SUMMARY OF THE INVENTION

Embodiments of apparatuses and methods for accident detection include operating an accident detection system in a traffic management system to detect a plurality of traffic impediments, such as traffic accidents, using a plurality of sensors and computer processors. Various embodiments of an accident detection system can use a wireless sensor network, for example. The wireless sensor network can be based on sensor nodes positioned in a number of locations along a roadway, such as a highway, thoroughfare, street, zone, or other areas, for example. The sensors can communicate with a central processor that receives data regarding traffic impediments, such as traffic flow data. Each sensor positioned along a road way is aware of sensed traffic conditions (for example, a number of vehicles crossing a fixed location) in order to assist in the reduction of traffic congestion. The information gathered through the respective sensors can be transmitted to a central computer processor for processing, displaying traffic information, and assisting in traffic management systems controlling traffic flow.

In various embodiments, sensors are placed in locations along the various roadways. The sensors are capable of detecting a number of vehicles along a road. The sensors are also capable of detecting an approximate number of vehicles that have crossed a fix point along a road. In embodiments of an accident detection system, sensors, such as wireless sensors, can also detect a level of vehicle speed, a number of vehicles in a particular lane of a roadway, and the amount of time each vehicle took to cross the sensor or a fixed point, for example.

Embodiments of methods for detecting a traffic impediment in an accident detection system include the sensors detecting a number of vehicles moving on a roadway. The accident detection system selects a particular area or zone on a multi-lane highway and then detects a number of vehicles moving in the selected area. The sensors then communicate the data, such as traffic flow data, to a controller. The controller processes the information and implements a fuzzy logic algorithm to determine whether there is a traffic impediment, such as a traffic accident, and the approximate location of a traffic accident or traffic impediment. This information can be then transmitted to a traffic management system, as can include or be associated with the accident detection system, for use in handling traffic flow among a number of roadways.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

With reference now to the drawings, in particular to FIGS. 1-6, thereof, embodiments of apparatuses and methods for an accident detection system using sensors to detect and report traffic impediments, and embodying features, principles, and concepts of various embodiments of the accident detection system using sensors will be described. The accident detection system can include a system connected to a local area network (LAN), a wide area network (WAN), internet, intranet, etc., and is capable of exchanging data with and retrieving data therefrom, for example. Embodiments of accident detection systems and methods for accident detection can also implement various programs and decision algorithms, such as a fuzzy logic algorithm, in determining whether a traffic impediment has occurred.

Figure 1:
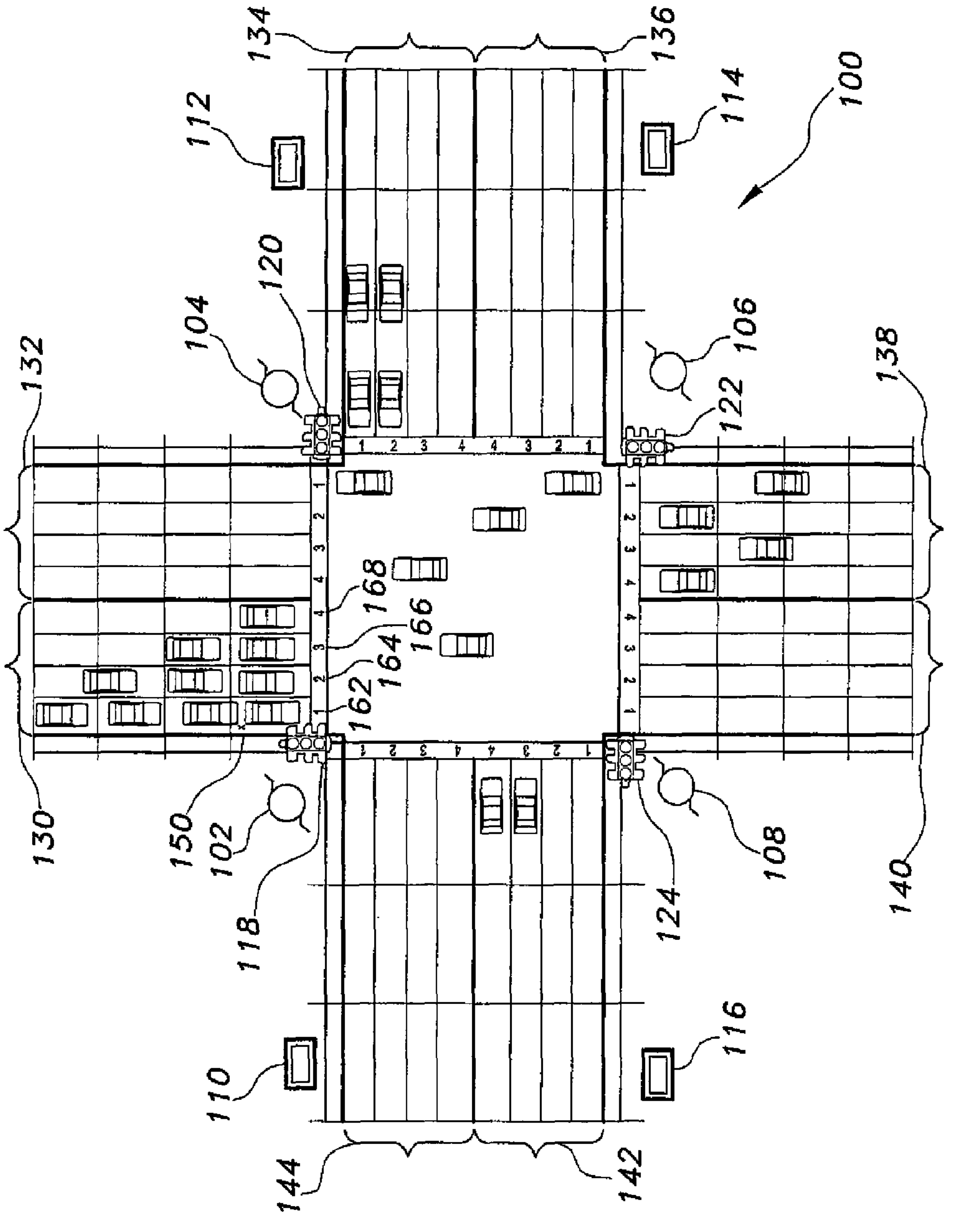
FIG. 1 is an environmental view of an intersection displaying vehicles, sensors, controllers, traffic signals and a traffic impediment, such as an accident, according to the present invention.

To assist in understanding the various embodiments of the accident detection system, reference can be made to FIG. 1. FIG. 1 illustrates an environmental view of a multi-lane intersection 100 depicting a number of vehicles, sensors, controllers, traffic signals and a traffic impediment, such as a traffic accident. Vehicles can be of any type, such as and including cars, trucks, motorcycles, carts, buses, bicycles, boats, and aircraft, for example. A roadway can include any travel path or navigation route, such a subway system, a maritime route or air route, for example, and should not be construed in a limiting sense. In FIG. 1 there is illustrated the multi-lane intersection 100, a northwest sensor 102, a northeast sensor 104, a southeast sensor 106, a southwest sensor 108, a northwest controller 110, a northeast controller 112, a southeast controller 114, a southwest controller 116, a northwest traffic light 118, a northeast traffic light 120, a southeast traffic light 122, a southwest traffic light 124, a first southbound zone 130, a first northbound zone 132, a first westbound zone 134, a first eastbound zone 136, a second northbound zone 138, a second southbound zone 140, a second eastbound zone 142, a second westbound zone 144, and a traffic accident 150.

Each multi-lane intersection 100 can have a number of zones, such as the first southbound zone 130, the first northbound zone 132, the first westbound zone 134, the first eastbound zone 136, the second northbound zone 138, the second southbound zone 140, the second eastbound zone 142, and the second westbound zone 144. In this illustration, a zone can be a part or a section of and include a larger street, thoroughfare, area, artery, freeway, highway, or roadway but is not limited in this regard. Each zone in a roadway can have multiple lanes, such as lane 1 162, lane 2 164, lane 3 166 and lane 4 168 in first southbound zone 130, for example. Each lane in a corresponding zone can have a number of vehicles therein, such as no vehicles or one or more vehicles therein, at a given time, for example.

The sensors are capable of detecting a number of vehicles in a number of zones. The northwest sensor 102 can detect a number of vehicles in either the first southbound zone 130 or the second westbound zone 144, for example. The northeast sensor 104 can detect a number of vehicles in either the first northbound zone 132 or the first westbound zone 134, for example. The southeast sensor 106 can detect vehicles in either the first eastbound zone 136 or the second northbound zone 138, for example. The southwest sensor 108 can detect vehicles in either the second southbound zone 140 or the second eastbound zone 142, for example.

Figure 2:
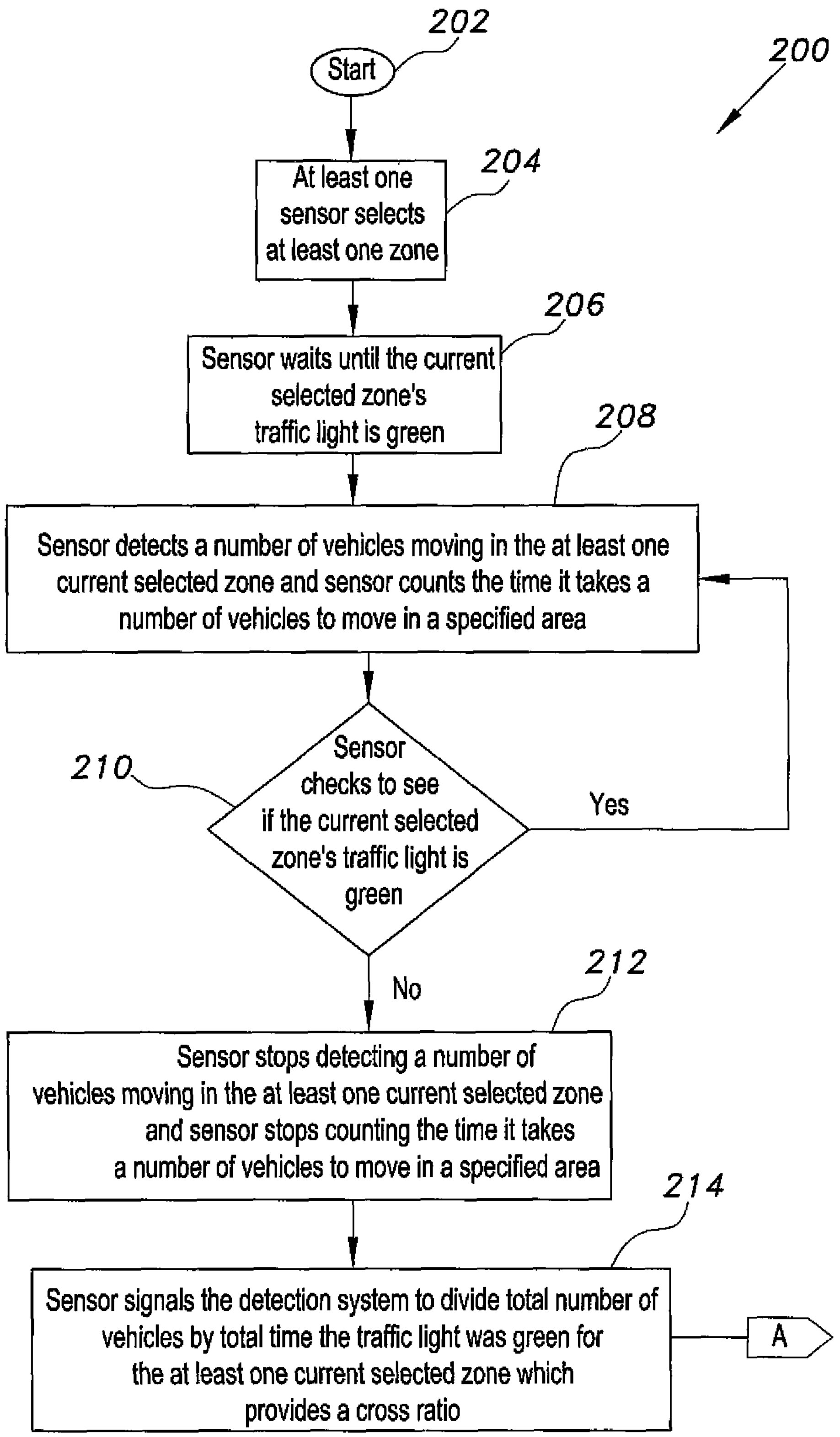
FIG. 2 is a flowchart of an embodiment illustrating a method for operating an accident detection system to detect a traffic impediment, such as an accident, according to the present invention.

FIG. 2 illustrates a flowchart of a logic tree 200 of an embodiment of a method for operating an accident detection system to detect a traffic impediment, such as an accident. In the flowchart of the logic tree 200 the environmental view of the multi-lane highway 100 of FIG. 1 can be used as an example of a typical roadway or multi-lane highway for purposes of illustrating the process of an accident detection system detecting an impediment to traffic flow. While FIG. 2 illustrates an embodiment in using the accident detection system in a multi-lane highway, the accident detection system is not limited in this regard and can also be used in a single lane roadway. The accident detection system can also be adapted to detect traffic accidents or impediments in a variety of manners, methods, and forms such as in a waterway, air route, subway, railway, or other means for transportation, for example.

Referring now to FIGS. 2 through 5, embodiments of an accident detection system and methods for accident detection are illustrated. The illustrated embodiments of an accident detection system and methods for accident detection start a first phase, or phase one, to detect traffic accidents or impediments at step 202 in FIG. 2 in which at least one sensor, such as the northwest sensor 102, begins scanning an area, zone, or lane at step 204. The northwest sensor 102 in the accident detection system continues scanning an area, zone, or lane and waits until a traffic light, such as the northwest traffic light 118, is green at step 206 before beginning detecting a number of vehicles in the scanned area, zone, or lane. In this example the northwest sensor 102 attempts to detect a number of vehicles in the first southbound zone 130. The northwest sensor 102 detects there are four vehicles in lane 1 162, three vehicles in lane 2 164, two vehicles in lane 3 166, and one vehicle in lane 4 168 at step 208 in the first southbound zone 130. At step 208 the northwest sensor 102 can also count the period of time it takes a number of vehicles to move in a specified area of the multi-lane highway 100, such as an area, zone, or lane thereof.

At step 210 the northwest sensor 102 checks whether the northwest traffic light 118 is still green. If the northwest sensor 102 determines the northwest traffic 118 light is still green, the northwest sensor 102 continues to detect a number of vehicles and record a period of time it takes a number of vehicles to move in a specified area at step 208. If the northwest sensor 102 determines the northwest traffic light 118 is no longer green at step 210, the northwest sensor 102 stops detecting a number of vehicles moving in the current selected zone and stops recording or counting the time it takes a number of vehicles to move in a specified area at step 212. The northwest sensor 102 can signal or transmit information to the accident detection system to implement a decision algorithm to divide the total number of vehicles detected by the total time the traffic light was green and can provide a cross ratio at step 214. The cross ratio can be defined by the following relation as:

$$\text{Cross Ratio} = \frac{\text{Total Number of Vehicles to Cross a Designated Area}}{\text{Total Time a Designated Traffic Light was Green}}. \quad (1)$$

Figure 3:
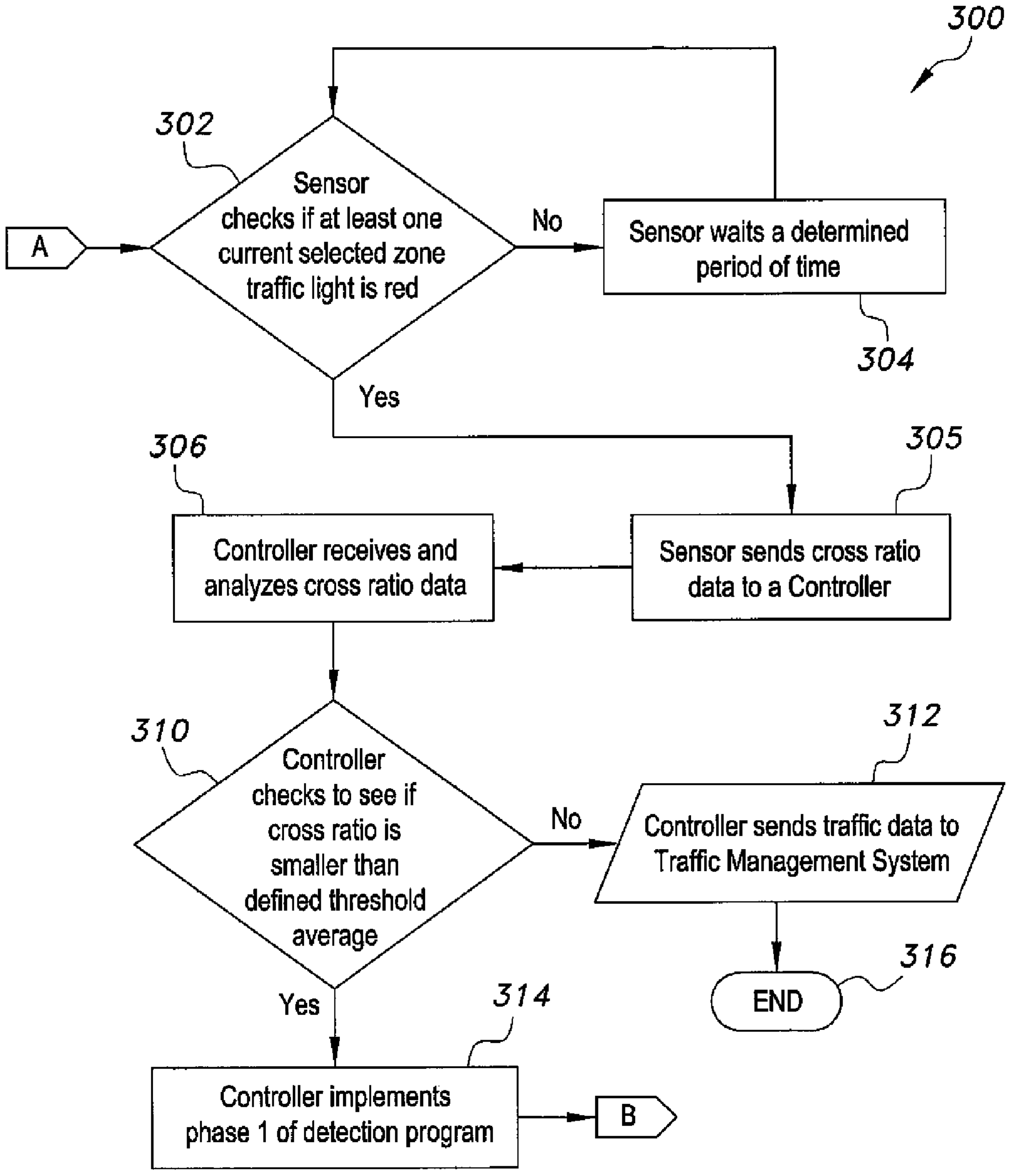
FIG. 3 is a flowchart of an embodiment illustrating a method for operating an accident detection system to detect a traffic impediment, such as an accident, according to the present invention.

At FIG. 3 an embodiment of an accident detection system method for accident detection continues its implementation and continues the use of the multi-lane highway 100 of FIG. 1 as an example of a typical roadway or multi-lane highway for purposes of illustrating an embodiment of a process of an accident detection system detecting an impediment to traffic flow. While FIG. 3 illustrates an embodiment in using the accident detection system in a multi-lane highway, the accident detection system is not limited in this regard and can also be used in a single lane roadway.

At step 302 of FIG. 3 the northwest sensor 102 checks whether the at least one current selected zone's traffic light is red, such as the northwest traffic light 118. If the northwest sensor 102 determines the northwest traffic light 118 is not red, the sensor waits a determined amount or period of time at step 304 and checks again whether the at least one current selected zone's traffic light is red at step 302. If it determined the northwest traffic light 118 is red, the northwest sensor 102 transmits the cross ratio data to a controller, such as the northwest controller 110, at step 305.

The northwest controller 110 receives and processes the cross ratio data and can begin to detect or determine the probability of an accident or other traffic impediment using the cross ratio data at step 306. In processing the cross ratio data, the accident detection system can use logic reasoning, e.g. fuzzy logic, in determining whether the cross ratio is less than the defined threshold under traffic conditions, such as the time of day, critical traffic hours, surrounding intersections, and overall congestion in the road. At step 310 the northwest controller 110 can compare whether the cross ratio data is smaller than the current selected zone's normal threshold average.

Figure 6:
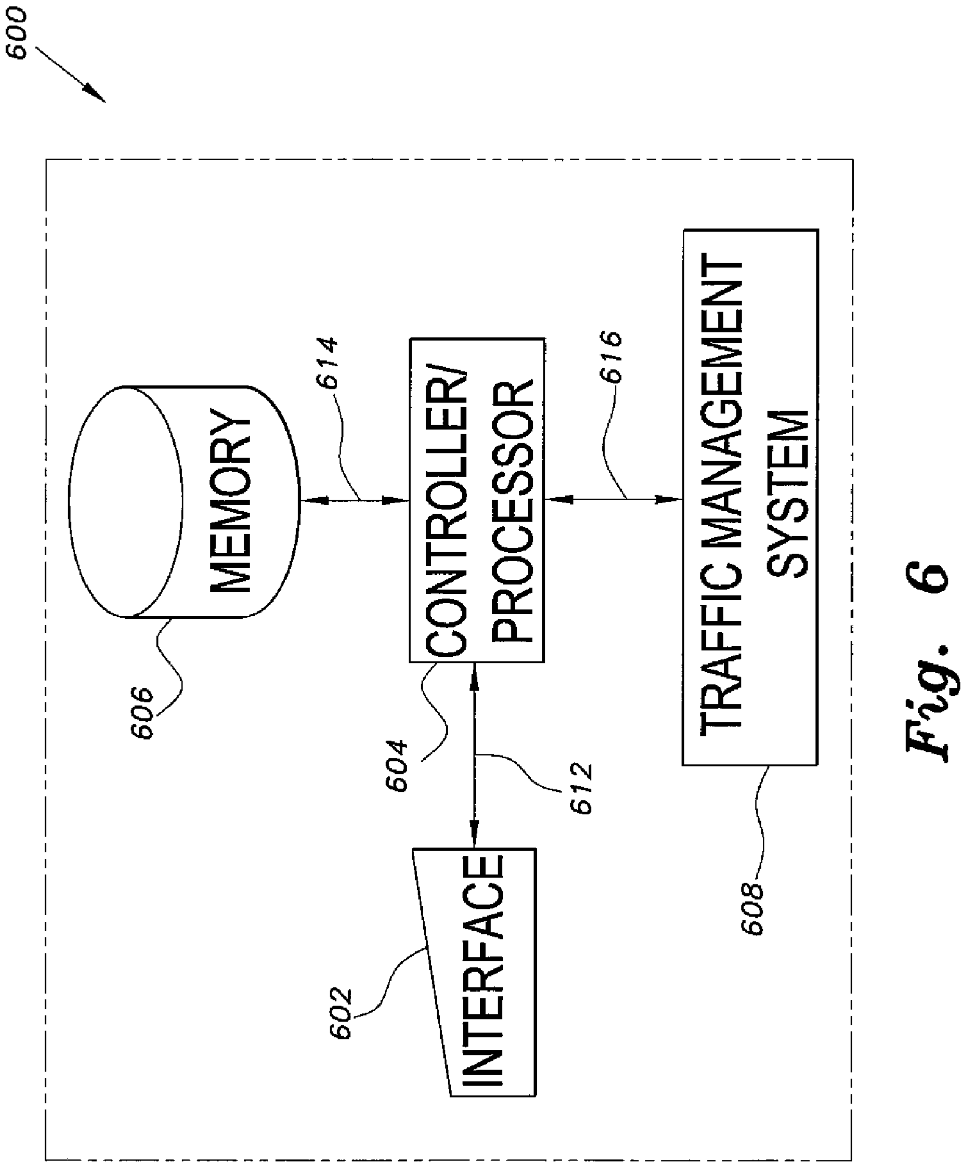
FIG. 6 is a block diagram illustrating an embodiment of a general accident detection system to detect a traffic impediment, such as an accident, according to the present invention.

If it is determined that the cross ratio data is not smaller than the current selected zone's normal or defined threshold average, the northwest controller 110 can send the traffic data, such as traffic flow data, to a traffic management system, such as a traffic management system 608 in FIG. 6, at step 312 and the current cycle of the accident detection system ends at step 316. If it is determined that the cross ratio data is smaller than the current selected zone's normal or defined threshold average, the northwest controller 110 implements phase 2 of the detection program, process or algorithm at step 314.

Figure 4A:
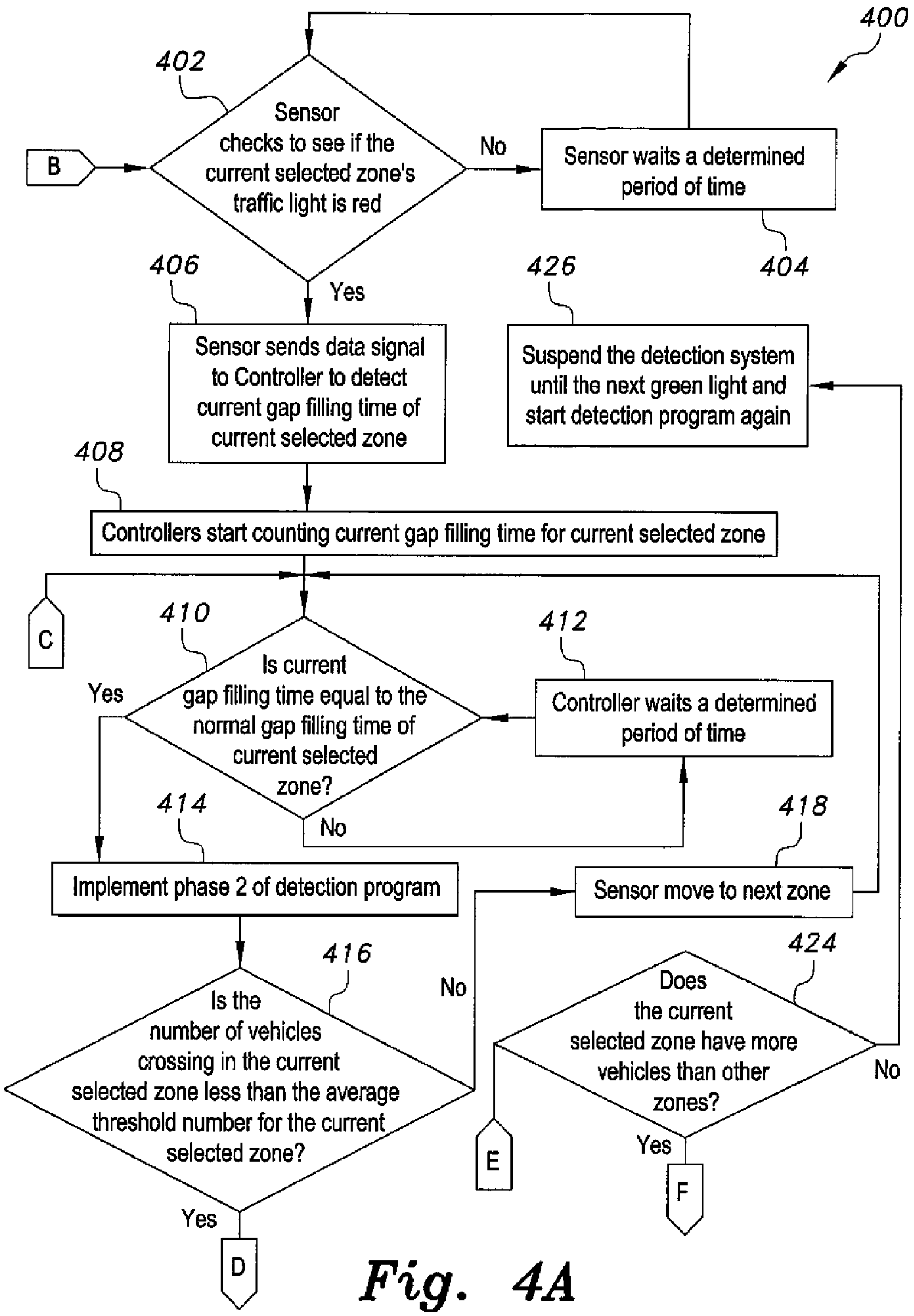
FIG. 4A is a flowchart of an embodiment illustrating a method for operating an accident detection system to detect a traffic impediment, such as an accident, according to the present invention.
Figure 4B:
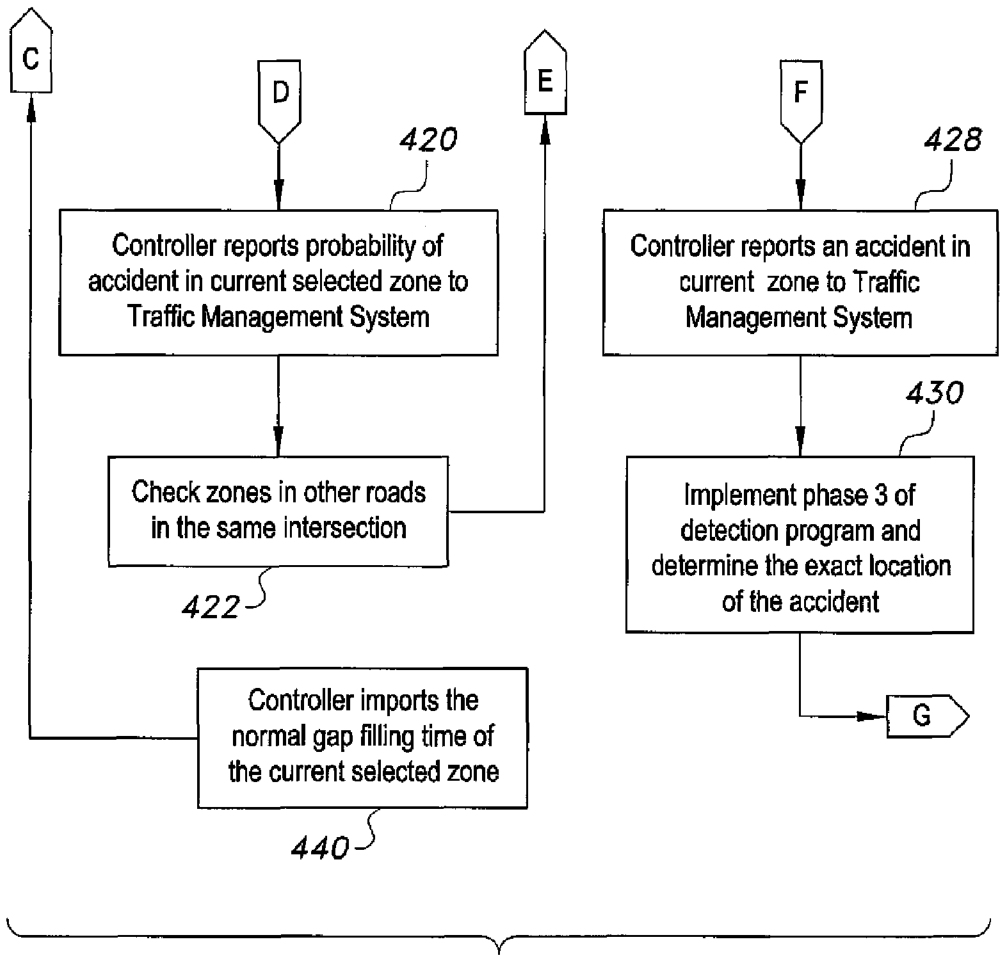
FIG. 4B is a flowchart of an embodiment illustrating a method for operating an accident detection system to detect a traffic impediment, such as an accident, according to the present invention.

At FIG. 4A and FIG. 4B a second phase, or phase 2 of the accident or impediment detection program, process or algorithm begins and the use of the multi-lane highway 100 of FIG. 1 as an example of a typical roadway or multi-lane highway for purposes of illustrating an embodiment of the process, program or algorithm of an accident detection system detecting an impediment to traffic flow continues. While FIG. 4A and FIG. 4B illustrates an embodiment of using the accident detection system in a multi-lane highway, the accident detection system is not limited in this regard and can also be used in a single lane roadway.

Phase two focuses on a gap filling time or an amount of time it takes cars or vehicles to fill a certain zone or specified area to determine the likelihood of whether an accident or other traffic impediment has occurred. At step 402 the northwest sensor 102 checks to determine whether the northwest traffic light 118 is red. If the northwest sensor 102 determines the northwest traffic light 118 is not red, the northwest sensor 102 waits a determined amount of time at step 404 and checks again whether the at least one current selected zone's traffic light is red at step 402. If it is determined the traffic light is red, the northwest sensor 102 transmits a data signal to the northwest controller 110 to detect the gap filling time, e.g. the time it takes a number of vehicles to fill an area, of the vehicles currently in the current selected zone, as a current gap filling time, at step 406. In determining the gap filling time for a zone or a specified area, the number of cars or vehicles each zone or specified area can hold is determined, such as by the following relation:

$$\text{Zone Weight} = \frac{\text{Number of Lanes} \times \text{Length of the Zone}}{\text{Length of car (vehicle)} + \text{Safe Distance (between vehicles)}}. \quad (2)$$

Continuing at step 408, the northwest controller 110 starts counting the current gap filling time for the current selected zone. The northwest controller 110 can then import data about the normal gap filling time for the current selected zone, such as first southbound zone 130, at step 420, and compare whether the current gap filling time is equal to the normal gap filling time of the current selected zone at step 410, the normal gap filling time can be determined by statistical data, for example. The average threshold number for at least one select zone or specified area can be imported into the controller, such as at step 440, from a non-transitory storage medium, such as a computer readable memory, for example.

If the current gap filling time is not equal to the normal gap filling time of the current selected zone or specified area the northwest controller 110 can wait a determined period of time at step 412 and check again whether the current gap filling time is equal to the normal gap filling time of the current selected zone at step 410. If it is determined the current gap filling time is equal to the normal gap filling time, the controller implements phase two of the detection program at step 414 and proceeds to step 416.

At step 416 the controller, such as northwest controller 110, can check whether the number of vehicles crossing in the current selected zone or specified area is less than the average threshold number of vehicles for the current selected zone or specified area. If it is determined the number of vehicles crossing in the current selected zone is not less than the average threshold number, a sensor can move to a new zone or a new specified area, such as the second westbound zone 144, at step 418 and the controller, such as the northwest controller 110, checks whether the current gap filling time is equal to the normal gap filling time for the current selected zone or specified area at step 410. If, at step 416, it is determined the number of vehicles crossing in the current selected zone is less than the average number of vehicles in the current selected zone, the northwest controller 110 can report the probability of a traffic accident or traffic impediment in the current selected zone at step 420.

The northwest controller 110 can then check zones or specified areas in other roads of the same intersection at step 422 and compares the number of vehicles in the current selected zone or specified area against the number of vehicles in the other zones at step 424. If it is determined the current selected zone does not have more vehicles than the number of vehicles in the compared zones or compared specified areas, the northwest controller 110 suspends the detection system until the next green light at step 426 and can start the detection program, process or algorithm for impediment or accident detection from the beginning, such as at step 202 in FIG. 2.

If at step 424 it is determined the current selected zone has more vehicles than the compared zones the northwest controller 110 reports an impediment, such as an accident, in the current selected zone or specified area, such as the first southbound zone 130, to a traffic management system at step 428. The northwest controller 110 then continues and implements a third phase, or phase three, of the accident or impediment detection program, process or algorithm at step 430 to determine the exact or most likely location of the impediment, such as an accident, such as the exact or most likely traffic lane where the traffic disturbance is located.

Figure 5:
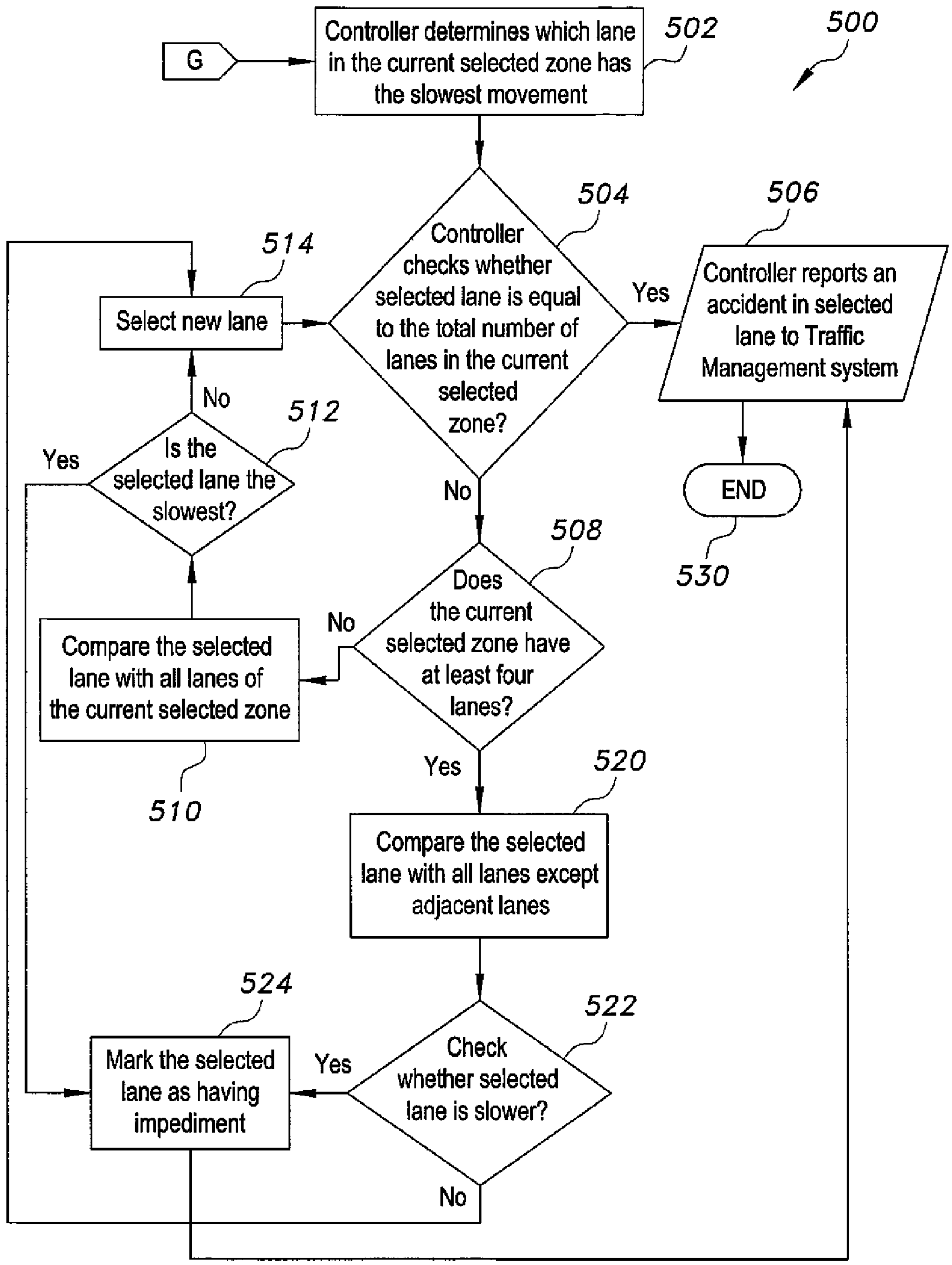
FIG. 5 is a flowchart of an embodiment illustrating a method for operating an accident detection system to detect a traffic impediment, such as an accident, according to the present invention.

In FIG. 5 the third phase of the accident or impediment detection program, process or algorithm of an embodiment of the accident detection system continues and can use the multi-lane highway 100 of FIG. 1 as an example of a typical roadway or a multi-lane highway for purposes of illustrating the process, program or algorithm of an embodiment of an accident detection system to detect an impediment, such as an accident, to traffic flow continues. While FIG. 5 illustrates an embodiment in using the accident detection system in a multi-lane highway, the accident detection system is not limited in this regard and can also be used in a single lane roadway. Continuing from the step 430, the northwest controller 110 determines which lane has the slowest movement in the current selected zone or selected specified area at step 502.

The northwest controller 110 can then check whether the selected lane is equal to the total number of lanes in the current selected zone or selected specified area at step 504. If it is determined that the selected lane, such as the lane 1 162, is equal to the total number of lanes in the current selected zone, the northwest controller 110 can report an accident or impediment in the selected lane of the current selected zone or specified area to the traffic management system, e.g. the traffic management system 608, at step 506 and the accident detection system ends at step 530.

If, at step 504, it is determined the selected lane, such as the lane 1 162 of a multi-lane zone, is not equal to the number of lanes in the current selected zone or selected specified area, the northwest controller 110 then checks whether the current selected zone or selected specified area has a plurality of lanes of at least a given number, such as at least four lanes, at step 508. If it is determined the current selected zone or selected specified area does not have a plurality of lanes of at least the given number, such as at least four lanes, the northwest controller 110 can compare the selected lane with all lanes of the current selected zone or selected specified area at step 510. After the northwest controller 110 compares the selected lane with all lanes in the current selected zone or selected specified area, the northwest controller 110 can determine whether the selected lane is the lane with the slowest movement at step 512.

If the controller, such as northwest controller 110, determines the selected lane is not the lane with the slowest movement in the current selected zone or selected specified area, the controller can select a new lane at step 514 and the process returns to step 504. If, at step 512, the northwest controller 110 determines the selected lane is the lane with the slowest movement in the current selected zone or selected specified area, the northwest controller 110 can mark the selected lane as having the traffic impediment, such as an accident, at step 524. The northwest controller 110 can then report an impediment, such as an accident, in the selected lane of the current selected zone or selected specified area to the traffic management system, e.g. the traffic management system 608, at step 506 and the accident detection system ends at step 530.

If, at step 508, the controller, such as the northwest controller 110, determines the current selected zone or selected specified area has a plurality of lanes of at least the given number, such as at least four lanes, such as the first southbound zone 130, the controller, such as the northwest controller 110, can then compare the selected lane, such as lane 1 162, with all the lanes in the current selected zone or selected specified area except for the adjacent lanes in the current selected zone or selected specified area at step 520.

The controller, such as the northwest controller 110, can check whether the selected lane, e.g. lane 1 162, is slower than the comparative lanes of the current selected zone or selected specified area at step 522. If it is determined the selected lane is not the slowest, the northwest controller 110 can select a new lane at step 514 and the process then returns to step 504. If it is determined the selected lane is the slowest lane in the current selected zone at step 522, the controller, such as the northwest controller 110 can mark the selected lane, e.g. lane 1 162, as having the traffic impediment, such as the traffic accident 150 in lane 1 162, at step 524. The controller, such as the northwest controller 110, can then report an impediment, such as the traffic accident 150, in the selected lane of the current selected zone or selected specified area to the traffic management system, such as the traffic management system 608, at step 506 and the accident detection system ends at step 530.

In FIG. 6, the generalized system 600, for embodiments of a traffic detection system, includes an interface 602, a memory 606, a controller/processor 604, such as can include one or more of the northwest controller 110, the northeast controller 112, the southeast controller 114, and the southwest controller 116, and the traffic management system 608 can include a controller/processor as a master processor, similar to the controller/processor 604, and can include or be associated with a memory, such as the memory 606, for example.

Information, such as traffic flow data from the sensors, such as from one or more of the northwest sensor 102, the northeast sensor 104, the southeast sensor 106, and the southwest sensor 108, can be acquired by the interface 602 through the network of the accident detection system and transmitted at 612 to the controller/processor 604. The controller/processor 604, such as included in one or more processors as can be an intermediate processor that can perform the functions of a master processor, such as the northwest controller 110, the northeast controller 112, the southeast controller 114, and the southwest controller 116, alone or in conjunction with the traffic management system 608, as can include a master processor, can determine traffic flow for at least one specified area of the roadway to determine whether an impediment to traffic flow exists in at least one area of a roadway as can be based on and can include a variety of factors such as the gap filling time, the cross ratio data, zone weight, the time of day, a day of the week, a month of the year, an area of the roadway and other factors that can influence traffic flow.

The traffic data, such as traffic flow data, can be stored at 614 in the memory 606, such as a computer readable memory, which can be any suitable type of computer readable and programmable memory. Traffic data can be based on traffic resulting from one or more of various types of vehicles such as cars, trucks, motorcycles, carts, buses, bicycles, boats, and aircraft, for example. Examples of computer readable memory as can be used or included in the memory 606 can include a tangible, non-transitory computer readable storage medium such as a magnetic recording apparatus, an optical disk, a magneto-optical disk, flash disk, usb drives, and/or a semiconductor memory (for example, RAM, ROM, etc.). The traffic data stored by computer readable memory, such as the memory 606, and processed by the computer implemented device, such as the controller/processor 604, can be transmitted at 616 to the traffic management system 608, as can also be a computer implemented device.

For example, information or data can be transmitted from or received by the interface 602, such as received sensor data and information as to a number of vehicles moving in a selected area, zone, or roadway, and transmitted information or data, such as traffic flow data, as to the number of vehicles moving and the speed of movement in a selected area, zone, or roadway, for example. Such information or data can be transmitted to or from the controller/processor 604 and stored and organized in the memory 606. The information stored and organized in the memory 606 can be processed by the controller/processor 604 and transmitted to the traffic management system 608 to promote a reduction in traffic congestion, for example. The traffic management system 608, in conjunction with the controllers, such as can include one or more of the northwest controller 110, the northeast controller 112, the southeast controller 114, and the southwest controller 116, can implement various actions based the information obtained as to the location of the accident or impediment, either upstream or downstream or both, in a roadway or highway, such as the multi-lane highway 100 of FIG. 1.

As an example of a downstream action implemented, a new road weight can be calculated starting after the affected zone or affected specified area in a roadway or highway, such as to provide a new green time interval or to override the number of cars of the affected queue or area to enhance traffic flow. For example, the traffic management system 608 can calculate or determine the number of zones after the zone of the roadway that has the accident or impediment and can multiply the number of zones by the number of lanes and the number of cars or vehicles each lane can hold to determine a value K.

The traffic management system 608, as to the zone determined to have the accident or impediment, can calculate or determine the number sections that are not affected by the accident and can then multiply each section by the number of cars it can hold and subtract a value, such as 50%, of the total to determine a value J. The values of K and J can be added to calculate or determine a new weight of the road. If the calculated or determined new weight of the road is less than a predetermined or reference value, the calculated or determined weight is applied to the downstream to therefore reduce the green light time and to increase the cross ratio to enhance traffic flow, for example.

As to an example of an upstream action implemented, a number of zones of a roadway affected by the impediment or accident, such as those upstream of the accident or impediment, are calculated or determined and the traffic light green time interval is updated of adjusted flow. For example, the traffic management system 608 can calculate or determine the zones of the roadway that lie before the affected zone determined to have the impediment or accident and add a value, such as 50% of the affected zone, to determine a value Z.

The traffic management system 608 then multiplies the determined value Z of the zones with the number of lanes in the road and a value, such as ten, to determine a value Y. The determined value Y is then provided to the corresponding upstream controller which then compares the determined value Y and the actual number of cars or vehicles that usually or typically pass to the downstream of the road. If the determination is less than the number of cars or vehicles that usually or typically pass, the green light time is adjusted to as to allow this portion of cars or vehicles to pass, to enhance traffic flow in the roadway, for example.

In embodiments of an accident detection system, operations are performed by the controller/processor 604 or by the traffic management system 608, which can be any suitable type of computer implemented device, such as a computer processor, for example. Also, the resulting information, resulting data, or resulting determination made by the controller/processor 604 or made by the traffic management system 608 from the information and data processed by the controller/processor 604 or by the traffic management system 608 can be stored in the memory 606 and can be transmitted through the interface 602, such as to at least one sensor or to one or more of the controllers or processors in the accident detection system, to detect and report a traffic impediment, such as an accident, to the traffic management system 608, for example.

Further, embodiments of an accident detection system and the methods for operating accident detection system can also include for the controller or processor to transmit traffic data regarding the number of vehicles in an area, roadway, lane, or zone, the number of vehicles causing the traffic flow impediment, and an estimated time the traffic impediment started, for example. Embodiments of an accident detection system, for example, can also be aware of traffic conditions in multiple consecutive or non-consecutive roads, or in parallel, connected, and non-connected roadways, such as shown on a map, and is not limited in this regard. Also, embodiments of an accident detection system can report multiple accidents consecutively, sequentially, non-sequentially or intermittently.

Additional embodiments of an accident system can include that the wireless sensors be located in a number of locations that are capable of transmitting and receiving signals. Furthermore, the sensors can be located in a variety of locations including above or underneath a roadway, freeway, or multi-lane highway, for example. The sensors can also be in a constant, a substantially constant, a periodic, a random, an on-demand active scanning mode, or can be activated at a designated time, or become activated when the sensor identifies a vehicle. Embodiments of an accident detection system were illustrated using a multi-lane highway. However, embodiments of apparatuses of and methods for accident detection can be used in a single roadway. The sensors can also be adapted for use in other environments, such as a waterway or airway, for example.

Embodiments of accident detection systems and the methods for operating an accident detection system or for accident detection can also include for the processor to transmit determined traffic data regarding whether at least one traffic impediment is on a number of roadways as can be displayed on a display associated with a traffic alert system, such as electronic or digital message boards, or on a computer display, such as in a control center for traffic management, which are capable of displaying information.

The information and operations that are transmitted throughout the various embodiments of an accident detection system or methods for operating an accident detection system or for accident detection can be in the form of electronic data, wireless signals, or a variation thereof, for example. The information and operations that are transmitted throughout the various embodiments can be sent wirelessly, optically, or by various types or arrangements of hard wire connections, or combinations thereof, among the various system components, for example.

Also, in embodiments of an accident detection system, statistical data regarding the number of vehicles at a number of selected zones, gap filling times for the selected zones and traffic flow of vehicles on selected zones at various times, days and months can be used by a fuzzy or a probabilistic algorithm, or a variation thereof, for determining whether a traffic impediment has occurred, for example. Statistical data regarding the number of vehicles at a number of selected zones, gap filling times for the selected zones, and traffic flow of vehicles on selected zones at various times, days and months can also be used by the accident detection system independently of, or in conjunction with, an algorithm for determining whether a traffic impediment has occurred, for example.

Embodiments of an accident detection system can be a component of a traffic management system which uses the traffic data, such as traffic flow data, collected by the accident detection system component in allowing for responsive and adaptive design in adjusting traffic flow based on the received traffic flow data. Embodiments of an accident detection system also allow for the accident detection system to control and adjust traffic flow independently or selectively, such as controlling one or more traffic lights, based on the collected traffic data to create a more efficient traffic flow.

Embodiments of an accident detection system using sensors can report the number of vehicles detected, the time it took each vehicle to cross a designated area, the speed of each vehicle, the average speed of vehicles in at least one zone, or a combination thereof, for example.

It is to be understood that the present invention is not limited to the embodiments described above, but encompasses any and all embodiments within the scope of the following claims.

We claim:

1. A method for detecting an impediment by an accident detection system, comprising:

providing a plurality of sensors associated with zones of a roadway, wherein each of the zones of the roadway is contiguous to its respective sensor and opposed to each other, each of the sensors detects a number of vehicles and the time it takes the vehicles to move through its respective corresponding zone of a roadway and transmits data signals of the number of vehicles and time detected;

providing a plurality vehicle control signals, each of the vehicle control signals being in communication with only its associated sensor;

providing at least one computer implemented device, the at least one computer implemented device including a processor and a program stored in a memory, the program directing the at least one computer implemented device to perform the following including:

i) receiving the traffic data from the plurality of sensors;

ii) determining traffic flow data corresponding to the transmitted data signals;

iii) determining whether at least one traffic flow impediment exists in an area of a roadway by determining traffic flow for at least one specified area of the roadway based on the traffic flow data in the at least one corresponding zone of the roadway divided by the data received from the plurality of vehicle control signals, wherein the determination is compared to a predetermined norm of traffic flow;

iv) determining whether at least one traffic flow impediment exists in an area of a roadway by determining traffic flow for at least one specified area of the roadway based on the number of lanes and length of the roadway divided by the length of the vehicle and distance between each vehicle on the roadway; and v) determining whether at least one traffic flow impediment exists in an area of a roadway by determining traffic flow for at least one specified area of the roadway based on items i)-iv), scanning by each of the sensors its respective zone of a roadway to detect a number of vehicles moving in at least one corresponding zone of the roadway;

receiving by each of the sensors scanning its respective zone of the roadway data regarding the number of vehicles moving in at least one corresponding zone of the roadway, wherein the receiving data includes control signal data from its respective vehicle control signal;

transmitting data signals corresponding to the number of vehicles in the at least one corresponding zone of the roadway detected by the at least one sensor to at least one processor;

determining by the at least one processor traffic flow data based on the transmitted data signals corresponding to the number of vehicles in the at least one corresponding zone of the roadway;

determining by the at least one processor whether a traffic flow impediment exists in an area of the roadway by determining traffic flow for at least one specified area of the roadway based on the traffic flow data in the at least one corresponding zone of the roadway;

determining by at least one intermediate processor or a master processor in a traffic management system whether a traffic flow impediment exists based on the traffic flow data; and adjusting by the at least one intermediate processor or the master processor in the traffic management system the traffic flow in at least one roadway when it is determined a traffic flow impediment exists in the area of the roadway to decrease traffic congestion based on the traffic flow data;

whereby the method for detecting is fully automated.

2. The method of claim 1, wherein the at least one intermediate processor or the master processor in the traffic management system determines whether a traffic flow impediment exists based on one or more factors affecting traffic flow including one or more of a gap filling time, cross ratio data, zone weight, a time of day, a day of the week, and a month of the year.

3. The method of claim 1, wherein the at least one intermediate processor or the master processor in the traffic management system determines whether a traffic flow impediment exists based on one or more factors affecting traffic flow including one or more of a gap filling time, cross ratio data, zone weight, a time of day, a day of the week, and a month of the year.

4. The method of claim 1, further comprising:

receiving by a master processor from at least one intermediate processor in a traffic management system data regarding a traffic flow impediment in the area of the roadway based on the traffic flow data; and adjusting by the master processor in the traffic management system the traffic flow in at least one roadway when it is determined a traffic flow impediment exists in the area of the roadway to decrease traffic congestion based on the traffic flow data.

5. The method of claim 4, wherein the intermediate processor in the traffic management system determines whether a traffic flow impediment exists in the area of the roadway based on one or more factors affecting traffic flow including one or more of a gap filling time, cross ratio data, zone weight, a time of day, a day of the week, and a month of the year.

6. The method of claim 1, wherein the at least one processor determines whether a traffic flow impediment exists based on one or more factors affecting traffic flow including one or more of a gap filling time, cross ratio data, zone weight, a time of day, a day of the week, and a month of the year.

7. The method of claim 1, further comprising:

receiving the traffic flow data by at least one master processor in a traffic management system, the master processor in the traffic management system determining whether the traffic flow impediment exists in the area of the roadway, the master processor in the traffic management system being distinct and separate from the at least one processor determining the traffic flow data.

8. The method of claim 1, wherein the at least one sensor comprises at least one wireless sensor to wirelessly communicate the data regarding the number of vehicles detected.

9. A computer implemented accident detection system, the system comprising:

a plurality of sensors associated with zones of a roadway, wherein each of the zones of the roadway is contiguous to its respective sensor and opposed to each other, each of the sensors detects a number of vehicles and the time it takes the vehicles to move through its respective corresponding zone of a roadway and transmits data signals of the number of vehicles and time detected;

a plurality vehicle control signals, each of the vehicle control signals being in communication with only its associated sensor; and at least one computer implemented device, the at least one computer implemented device including a processor and a program stored in a memory, the program directing the at least one computer implemented device to perform the following including:

vi) receiving the traffic data from the plurality of sensors;

vii) determining traffic flow data corresponding to the transmitted data signals;

viii) determining whether at least one traffic flow impediment exists in an area of a roadway by determining traffic flow for at least one specified area of the roadway based on the traffic flow data in the at least one corresponding zone of the roadway divided by the data received from the plurality of vehicle control signals, wherein the determination is compared to a predetermined norm of traffic flow;

ix) determining whether at least one traffic flow impediment exists in an area of a roadway by determining traffic flow for at least one specified area of the roadway based on the number of lanes and length of the roadway divided by the length of the vehicle and distance between each vehicle on the roadway;

x) determining whether at least one traffic flow impediment exists in an area of a roadway by determining traffic flow for at least one specified area of the roadway based on items i)-iv), and xi) adjusting the traffic flow in at least one roadway when it is determined a traffic flow impediment exists in the area of the roadway to decrease traffic congestion based on the traffic flow data;

wherein the system is fully automated.

10. The computer implemented accident detection system of claim 9, wherein the at least one computer implemented device includes a first computer implemented device and a second computer implemented device, the first computer implemented device determines whether a traffic flow impediment exists based on the traffic flow data and the second computer implemented device adjusts the traffic flow in at least one roadway when it is determined a traffic flow impediment exists in the area of the roadway to decrease traffic congestion based on the traffic flow data.

11. The computer implemented accident detection system of claim 10, wherein the second computer implemented device includes a master processor and is distinct and separate from the first computer implemented device that includes an intermediate processor.

12. The computer implemented accident detection system of claim 9, wherein the at least one sensor comprises at least one wireless sensor to wirelessly communicate the data regarding the number of vehicles detected.

* * * * *